United States Patent Office 3,288,846
Patented Nov. 29, 1966

3,288,846
PROCESSES FOR PREPARING ORGANO-
PHOSPHONIC ACIDS
Riyad R. Irani, Florissant, and Kurt Moedritzer, St. Louis, Mo., assignors to Monsanto Company, a corporation of Delaware
No Drawing. Filed Nov. 13, 1961, Ser. No. 152,048
23 Claims. (Cl. 260—500)

The present invention relates to novel processes for manufacturing certain organophosphorous compounds. More specifically, the present invention relates to novel processes for preparing aminomethylenephosphonic acid, N-substituted aminomethylenephosphonic acids, and both N- and C-substituted aminomethylenephosphonic acids.

The compounds that can be manufactured by the processes of this invention are herein generically termed "aminoalkylenephosphonic acids." They can be characterized as containing at least one N—C—P linkage in their molecules, and as having the formula:

(1) 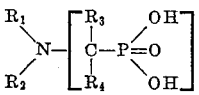

wherein $R_3$ and $R_4$ can be like or unlike, and are either hydrogen or organic radicals; and $R_1$ and $R_2$ can be like or unlike, and can be hydrogen, hydroxyl, amino, organic radicals, or alkylene phosphonic acid radicals (such as that within the bracketed portion of Formula 1).

The aminoalkylenephosphonic acids exhibit characteristics of both acids and amines, and thus can undergo reactions characteristic of both of these functional groups. Accordingly, they have utility in practically all fields of organic chemistry wherein their acidic and/or their amine properties can be utilized. In particular, the higher molecular weight N-substituted compounds can be used as water-repellants, or fabric softening agents, while the relatively lower molecular weight aminoalkylenephosphonic acids are useful as water softening agents in, for example, boiler water where, in the absence of these agents, iron can precipitate from the water.

Some of the aminoalkylenephosphonic acids have been manufactured heretofore, but only with considerable difficulty, and at commercially prohibitive expense. Methods utilized heretofore included the hydrolysis of amides, and hydrolysis of organic phosphonate esters. At any event, in these heretofore-known procedures, the amide or the ester had to first be prepared. Thus, at least two separate and distinct chemical processes had to be utilized heretofore in order to prepare any of the aminoalkylenephosphonic acids with which this invention is concerned.

It is an object of this invention to provide simplified methods for manufacturing aminoalkylenephosphonic acids and their salts.

The above, as well as other objects of this invention can be accomplished by reacting together, under certain conditions, (a) A reactive nitrogenous material (i.e. a nitrogen-containing or nitrogenous compound such as ammonia, a primary amine, or a secondary amine), (b) An aldehyde or a ketone, and (c) Orthophosphorous acid.

It has been found that by forming a mixture of (a), (b) and (c) and subjecting the mixture to reactive conditions an aminoalkylene phosphonic acid compound having at least one N—C—P linkage can be formed.

The invention has been found to be widely applicable to practically any of many selected nitrogen-containing compounds (i.e. organic primary or secondary amines, as well as to ammonia and ammonium salts), and to practically any aldehyde and ketone, wherein $R_3$ and $R_4$ can be either like or unlike, and are either hydrogen or organic radicals. When at least one of $R_1$ or $R_2$ is an organic radical, the compound of Formula 2 is an organic amine.

(2) $$R_1-\underset{H}{\overset{|}{N}}-R_2$$

Typical examples of primary amines that can be used in the practice of this invention are methylamine, ethylamine, butylamine, 2-chlorobutylamine, t-butylamine, dodecylamine, octadecylamine, aniline, m-toluidine, furfurylamine, naphthylamine, benzylamine, phenethylamine, hydroxylamine, 1-indanethylamine, hydrazine, ethylene diamine, diethylene triamine, glycine, fluorenamine, 2-furanamine, cadaverine, phenylenediamine, monoethanolamine, 1,4-anthradiamine, 1,3-propanediamine, 1,4-naphthalenediamine, 3,3'-biphenyldiamine, 2-aminopyrolle, 1-aminoacridine, N-tetrapropenyldiethylenetriamine, and the like. Secondary amines that can be utilized include dimethylamine, methylethylamine, N-ethylisopropylamine, N-1,1-dichloroethylisopropylamine, N-phenylbenzylamine, dimethanolamine, didodecylamine, N-octadecylethylamine, difuranamine, N-benzylfurfurylamine, N-ethylbenzylamine, N-bromoethylbenzylamine, N-t-butylnaphthylamine, N-methyl-1-indanethylamine, N-N-diethyl-1,4-naphthalenediamine, di-n-propylamine, di-n-3,3-chloropropylamine, and the like.

Ammonia can be furnished for reaction with orthophosphorous acid and either an aldehyde or a ketone, according to the processes of this invention either in the form of aqueous ammonia (i.e. simply dissolved in water), or in the form of fairly water-soluble salt, such as, for example, ammonium chloride, ammonium acetate, monoammonium phosphite, diammonium phosphite, monoammonium phosphate, ammonium bromide, ammonium formate, ammonium bromate, ammonium carbonate, ammonium carbamate, ammonium nitrite, ammonium molybdate, ammonium butyrate, ammonium sulfite, and the like. Since, ordinarily, reactions that tend to compete with the desired interreaction of orthophosphorus acid, with an aldehyde or a ketone and one of the reactive nitrogenous materials exemplified by Formula 2, it is preferred that ammonium compounds such as ammonium hypophosphite, ammonium nitrate, ammonium malonate, ammonium chloroplatinate, and the like, be utilized to only a limited extent, if at all, in the processes of the present invention.

Aldehydes and ketones that can be used in the processes of this invention include all of those having the formula:

(3) $$R_3-\overset{O}{\underset{\|}{C}}-R_4$$

wherein $R_3$ and $R_4$ can be like or unlike, and are selected from the group consisting of hydrogen and organic radicals. When $R_3$ is hydrogen, the material represented by Formula 3 is an aldehyde. When both $R_3$ and $R_4$ are organic radicals, it is a ketone. Examples of some of the aldehydes that are useful in the practice of the present invention are formaldehyde, acetaldehyde, 2-bromoacetaldehyde, caproaldehyde, nicotinaldehyde, crotonaldehyde, 2,2-dichloromalonaldehyde, gluteraldehyde, p-tolualdehyde, benzaldehyde, 3-chlorobenzaldehyde naphthaldehyde, anthraldehyde, 2-furaldehyde, malonaldehyde, phthaldehyde, 3,5-dibromophthalaldehyde, 1- cyclehexene-1-carboxaldehyde, 3-quinolinecarboxaldehyde, 3-aminobenzaldehyde, N-(3-formylpropyl) phthalimide, etc. Typical of the ketones that can be used are acetone, methylethylketone, 2-pentanone, 3-pentanone, 1-chloro-2-propanone, butyrone, 1-bromo-7-nitro-4-heptanone, acetophenone, p-bromo-α-chloroacetophenone, 5,6,7,8-tetrahydro-1-isobutyronapthone, capriphenone, α,α-dimethylstearophenone, 1-cyclohexyl-2-methyl-1-propanone, 1-(2- furyl)-1-butanone, 1-(5-quinolyl)-1-pentanone, 2-acetyl chrysene, 4-bromobenzophenone, 2,4-pentanedione, 3,4-diacetyl - 2,5 - hexanedione, 3-cyclohexene-1-one, 2(3)-pyridone, 2-acetonyl cyclohexanone, and the like.

Note that the specific examples of amines, aldehydes, ketones, and ammonium compounds presented above do not represent the only such compounds that can be utilized in the practice of the invention. They are indicative, however, of the very wide range of raw materials that can be used. For example, in the specific examples listed can be found organic radicals such as aliphatic hydrocarbyl, alicyclic, aryl, alkylaryl, heterocyclic, substituted aliphatic hydrocarbyl, substituted alicyclic, substituted aryl, substituted alkylaryl, and substituted heterocyclic radicals. These radicals can be either saturated or unsaturated, and can contain straight or branched chains. Organic radicals containing "rings," too, are illustrated above. Multiring radicals containing 2 to 5, or even more can be utilized to advantage in the practice of the invention.

Because of factors such as steric hinderance, which can become significant when the preparation of relatively high molecular weight aminoalkylenephosphonic acids is undertaken, the aldehydes that find greatest utility in the practice of the invention usually contain no more than 30 carbon atoms, while the ketones that are most broadly useful herein usually contain no more than 20 carbon atoms.

Orthophosphorus acid, illustrated by Formula 4, is readily available commercially.

(4) 

It can be utilized in the processes of the present invention either as the acid, itself, or in the form of its salts, such as its mono- or di-ammonium salts, and mono- or di-alkali metal salts. When orthophosphorous acid is utilized in the salt form, usually a small amount of a supplementary acid should also be utilized in order to effectively convert the salt form into the more reactive orthophosphorus acid. (The use of these "supplementary" acids in the processes of this invention will be discussed in more detail subsequently.)

Ordinarily, for at least one from each of the groups of materials represented by Formulas 2, 3, and 4, above, to undergo an interreaction to form one of the aminoalkylenephosphonic acids, they must simply be mixed together in certain relative proportions (the relative proportions are designed to result in the formation of particular phosphonic acids and will be described in more detail below) in an acidic aqueous medium, and, ordinarily subjected to an elevated temperature for a short time. At room temperature, the rate of interreaction of these materials is extremely slow. Increasing the temperature generally results in increasing the rate of the desired reaction, so that, usually, if the temperature of a mixture of phosphorous acid, one of the reactive nitrogenous materials described above, and an aldehyde or ketone is above about 70° C., the rate of their interreaction is sufficiently high, so that conventional mixing and handling equipment can be utilized to produce the aminoalkylenephosphonic acids continuously and at a commercially practical cost, if desired. It has also been found that increasing the reaction temperature for the processes of this invention (in the temperature range above about 75° C. up to about 200° C. [the latter being the spontaneous decomposition temperature of orthophosphorus acid at atmospheric pressure] or even higher temperatures if increased pressures are utilized) results in a fairly rapid increase in the rate of the desired reaction. Thus, for practical purposes, it is preferred that reaction temperatures for the formation of the aminoalkylenephosphonic acids, wherein orthophosphorus acid is utilized according to the processes of this invention, be above about 85° C. Temperatures within this preferred range (i.e. about 85° C. to about 200° C.) can readily be maintained by refluxing the aqueous reaction mixture at, above, or below atmospheric pressure until the desired reaction has been completed.

It is believed surprising that the pH of the reaction medium has apparently an important influence upon the rate of the desired reaction. For example, it has been found that the rate of the desired reaction in mixtures (containing a primary amine, formaldehyde, and orthophosphorous acid in the molar ratio, respectively of 1:2:2) having a pH above about 4 is extremely low. Perhaps one reason for the low rate of the desired reaction in reaction media having pH's above about 4 is that apparently in these systems a competing reaction (the oxidation of orthophosphorous acid to orthophosphoric acid) takes precedence over the desired interreaction of orthophosphorous acid with the organic carbonyl compound and the amine. Actually, it is preferred that the pH of the reaction mixture (of orthophosphorous acid plus aldehyde or ketone plus ammonia, primary amine, or secondary amine, and usually at least some water) be below about 2 in order to achieve optimum results in the practice of the present invention. When one of the salts of orthophosphorous acid is utilized as a raw material, and when the ratio of reactive nitrogenous material to orthophosphorous acid in the reaction mixture is relatively high, the "natural," or usual pH of the reaction mixture or reaction medium is generally not within the preferred range. However, the pH of the reaction medium can be adjusted into the most effective range by adding to the system any of the conventional acids having the ability to lower the pH of the reaction medium. For example, hydrochloric, sulfuric, hydrobromic, phosphoric, and sulfonic acids, as well as many others can be utilized for this purpose.

Ordinarily the desired reaction will be fairly complete, under optimum reaction conditions in a very short time, for example, in less than about 5 minutes, when the relatively low molecular weight aminoalkylenephosphonic acids are being prepared. Generally, when relatively lower reaction temperatures and when the relatively higher molecular weight amines, aldehydes, and ketones are utilized (as raw materials) in the processes herein contemplated, somewhat longer reaction times are required in order to produce optimum yields of the desired products. However, usually no more than about 5 hours should be required for the desired reaction to be completed under good reaction conditions, no matter which of the above-described raw materials is utilized. On the average, it can be said that, under optimum reaction conditions, generally from about 10 minutes to about 3 hours is required in order to produce fairly pure aminoalkylenephosphonic acid products.

It was mentioned heretofore that usually at least some water is present in the reaction medium. While it is not essential that water must be present therein, it has been found that the presence of at least some water contributes substantially to such factors (during and after the reaction) as ease of handling of the reaction medium, ease of maintaining the desired reaction temperature (by refluxing, as described above), ease of maintaining adequate heat transfer within the reaction mixture, decreasing the viscosity of the reaction products, etc. Thus, it is desirable that at least about 5 weight percent of water (based on the total weight of the raw reaction materials charged into the reaction mixture), and preferably at least about 15 weight percent of water be present in the reaction mixture before it has been exposed to temperatures above about 90° C. for any extended period of time. Additional water can also be added to the reaction medium from time to time if and as it is needed. Since, in some instances, some of the water will be removed from the reaction medium after the reaction is complete it is usually not practical to utilize more than about 90 weight percent of water at the outset of the reaction.

The processes of this invention can be carried out with conventional, readily available chemical processing equipment. For example, a conventional heated glass-lined mixing (reaction) vessel fitted with a reflux condenser and a fairly efficient stirrer can be advantageously utilized in practicing any of the preferred embodiments of the invention described in the examples below.

The orthophosphorous acid, nitrogenous materials, and aldehydes or ketones with which this invention is concerned can be intermixed in any manipulative manner without detracting appreciably from the benefits that can be derived from the invention. For example, they can be simply poured together in the appropriate proportions (which proportion will be discussed below) into a mixing vessel, blended, and then heated to the reaction temperature. Or the ingredients can be warmed individually, before they are intermixed. (This particular procedure is useful when higher molecular weight, solid aldehydes, ketones, and amines are utilized. Thus, they can be melted before they are placed into the reaction vessel.) The amines or ammonia can be utilized in the form of their acid salts. Sometimes it is convenient and desirable to intermix the amine or ammonia with the phosphorous acid before they are heated very much above ambient temperatures; especially when the ammonia or amines are not utilized in the form of salts.

When aldehydes or ketones having boiling points below the temperatures at which this invention is practiced are utilized in the practice of the invention usually significantly better yields of the desirable aminoalkylene phosphonic acids (based on the amount of aldehyde or ketone charged into the reaction vessel), can be attained if the aldehyde or ketone is added slowly to the mixture of orthophosphorous acid and reactive ntirogenous material, while the temperature of said mixture is within the desired range. For example, when an aqueous mixture consisting of one mole of ammonia, three moles of orthophosphorous acid, and three moles of formaldehyde (calculated theoretically to result in the production of one mole of ammonium trimethylenephosphonic acid) is held at 100° C. for an extended period of time (in order to assure "complete" reaction), only about 0.45 mole of the desired product is made. However, if the same amount of formaldehyde is added slowly (i.e. over a period of about 15 minutes) to a blend of the same amount of water, one mole of ammonia, and three moles of phosphorous acid held at a temperature of about 100° C., more than 0.70 mole of the desired product is produced. Thus, in the practice of this invention, the addition of the aldehyde or ketone slowly to a hot mixture of phosphorous acid plus one of the desirable reactive nitrogenous materials described above is a particularly preferred embodiment.

The amino-mono-alkylenephosphonic acids are those having the formula:

(5)
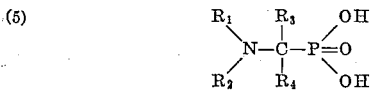

wherein $R_1$, $R_2$, $R_3$, and $R_4$ have the same meaning as in Formula 1 above except that $R_1$ and $R_2$ cannot be alkylene phosphonic acid radicals. Ordinarily, in view of the foregoing disclosure, it would be expected that when a reaction mixture of (a) one of any of the amines described above, (b) orthophosphorous acid, and (c) an aldehyde or ketone in the molar equivalent ratio of about 1:1:1, respectively is prepared, the alkylene phosphonic acid that would be formed when this reaction mixture is heated to above about 75° C. would be almost entirely the amino-mono-alkylenephosphonic acid. However, unless the nitrogenous material that is utilized is a secondary amine, the product from such a reaction as that just described has been found to be a mixture of amino-mono-, di-, and tri-alkylenephosphonic acids (the actual composition depending to some extent upon the particular reactive nitrogenous material that is utilized). When a secondary amine is used in such a reaction, there is only one position on the nitrogen atom that is available for reaction with the other ingredients. Thus, the amino-mono-alkylenephosphonic acid is the only alkylenephosphonic acid that can be formed in a reaction mixture containing a secondary amine as the sole reactive nitrogenous material.

The amino-di-alkylenephosphonic acids are those having the formula:

(6)
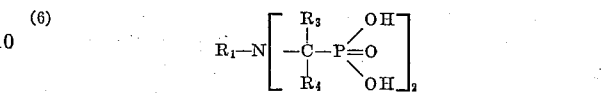

wherein $R_1$, $R_3$, and $R_4$ have the same meaning as in Formula 1, above except that $R_1$ cannot be alkylene phosphonic acid radicals. It has been found that either ammonia or primary amines can be utilized in the processes of this invention to produce the amino-di-alkylenephosphonic acids. However, for reasons similar to those given in the discussion of the application of the invention to the manufacture of amino-mono-alkylenephosphonic acids, when relatively pure amino-di-alkylenephosphonic acids are to be manufactured, it is preferred that the reactive nitrogenous material in the reaction mixture be a primary amine. In addition, it is best that the molar ratio of reactive nitrogenous material to orthophosphorous acid and to the aldehyde or ketone in the reaction mixture be at most about 1:2, respectively (i.e. excess aldehyde or ketone and/or orthophosphorous acid can be present, but it is preferred that no excess amine be present in the reaction mixture over that which is theoretically required to make the amino-di-alkylenephosphonic acid). If the reaction of primary amine with orthophosphorous acid, and aldehyde or ketone is not carried to completion (based on the amount of amine present) some amino-mono-alkylenephosphonic acids can be present in the reaction product, but there will be essentially no amino-tri-alkylenephosphonic acid present therein unless the primary amine had contained some ammonia. When ammonia is utilized in the foregoing reaction mixture (wherein the molar ratio of N:P is about 1:2), the reaction product will usually contain a mixture of amino-mono-, di-, and tri-alkylenephosphonic acids.

The amino-tri-alkylenephosphonic acids are those having the formula:

(7)
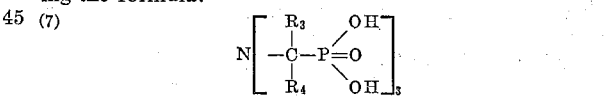

wherein $R_3$ and $R_4$ have the same meaning as in Formula 1, above. Amino-tri-alkylenephosphonic acids result from reacting (a) orthophosphorous acid and (b) an aldehyde or a ketone with (c) ammonia in a molar ratio of about 3:3:1, respectively. In processes of the present invention, excess aldehyde or ketone (over the molar ratio of 3:1 [of aldehyde or ketone to ammonia, respectively]) can sometimes be utilized to advantage. An excess of orthophosphorous acid can also be utilized in these processes. However, if the molar ratio of ammonia to orthophosphorous acid and aldehyde or ketone is raised above 1:3:3, respectively, a mixture of amino-mono-, di-, and tri-alkylenephosphonic acids in the reaction product is inevitable. Thus, when it is desired to produce a relatively pure amino-tri-alkylenephosphonic acid according to the processes of the present invention it is preferred that the molar ratio of ammonia to orthophosphorous acid, respectively, in the reaction mixture be, at most, about 1:3, and that the molar ratio of ammonia to aldehyde or ketone respectively, in the reaction mixture be, at most, about 1:3.

In the foregoing discussion relating to the relative proportions of reactive nitrogenous material, orthophosphorous acid, and aldehyde or ketone that can be used in the processes of this invention, the amines and carbonyl-containing materials were discussed as though they were monofunctional (i.e., as though they contained only one functional group in their molecules). However, from the specific examples listed above, it can be seen that the present invention is not at all limited to the use of monofunctional amines and aldehydes or ketones. When a compound containing more than one primary or secondary amine, for example, in its molecule is utilized in the processes of the present invention, it should be recalled that no more than one organic carbonyl group (from the aldehyde or ketone) and one orthophosphorous acid molecule can be reacted with each reactive hydrogen attached to the amine. Therefore, if a relatively pure aminoalkylenephosphonic acid is to be produced (wherein substantially all of the raw materials have been reacted together in the process for its preparation), the reaction mixture should contain the reactive nitrogenous compound, the aldehyde or ketone and the orthophosphorous acid in a "molar equivalent ratio" (i.e. the ratio of molar equivalent weights) of 1:1:1, respectively (where the molar equivalent weight of the amine is its molecular weight divided by the number of reactive or replaceable hydrogens attached to the nitrogen(s) contained therein, the molar equivalent weight of the aldehyde or ketone is its molecular weight divided by the number of aldehyde or ketone carbonyl groups contained therein, and the molar equivalent weight of orthophosphorous acid is its molecular weight). For example, the molar equivalent weight of ethylene diamine is 15, while the molar equivalent weight of phthalaldehyde is 67.

It was mentioned above that one reason why yields of the desirable aminoalkylene phosphonic acids are not usually 100% of theory in the processes of this invention is that, in addition to the desired N—C—P linkage forming reaction, the orthophosphorous acid also undergoes an oxidation reaction (to form orthophosphoric acid) under the conditions that usually favor the desired reaction. Since in most instances the presence of orthophosphoric acid in the final amino alkylene phosphonic acid products is not particularly detrimental, the inclusion of excess orthophosphorous acid into the reaction medium is generally all that is necessary to make up for this "loss" of orthophosphorous acid from the desired reaction. However, it has now been discovered that the presence of at least a catalytic amount of halide ions in the reaction mixture (of reactive nitrogenous material, orthophosphorous acid, aldehyde or ketone, and usually water) inhibits the oxidation of orthophosphorous acid to orthophosphoric acid, and thus makes it possible to produce relatively more of the desired aminoalkylene phosphonic acid product from a given reaction mixture than could otherwise be produced in the absence of halide ions therefrom. Apparently, any simple halide ion can be utilized to accomplish the inhibition described above, although for economic purposes chloride is preferred. The halide ions can apparently be introduced into the reaction mixture in any way whatever without detracting significantly from the benefits than can be derived from practicing the invention, provided it is introduced thereinto before the temperature of the reaction mixture has been held above about 70° C. for more than a few minutes. For example, it can be added in the form of a hydrohalide acid such as HCl, HBr, HI, etc., and as an inorganic salt, such as NaCl, KCl, NaBr, $CaCl_2$, and the like. One particularly convenient way is as the ammonium salt as, for example, $NH_4Cl$, wherein the ammonium ion can be utilized in the desired N—C—P linkage-forming reaction for the production of an aminoalkylenephosphonic acid. Even very small amounts of halide ions in the reaction mixture have been found to inhibit the oxidation of orthophosphorous acid to some extent. Excellent results can be accomplished when there is utilized in the reaction mixture between about 0.3 and about 10, and preferably at least about 0.5 weight percent of halide ions. Halide ions in excess of these amounts can be present without any apparent detrimental effects on the processes of the invention. However, as a practical matter, generally, not more than about 20 weight percent of halide ions is utilized in the processes. Table I, below, illustrates the effectiveness and desirability of utilizing simple halide ions in the processes of this invention.

TABLE I.—EFFECT OF HALIDE CATALYST [1]

| Test Number | 1 | 2 | 3 | 4 | 5 |
|---|---|---|---|---|---|
| Raw Material, moles: | | | | | |
| Orthophosphorous Acid | 3 | 3 | 3 | 3 | 3 |
| Formaldehyde (aqueous) [2] | 3 | 3 | 3 | 3 | 6 |
| Ammonia: | | | | | |
| Aqueous | 1 | | | 0.9 | |
| As $HN_4Cl$ | | 1 | | 0.1 | 1 |
| As $HN_4Br$ | | | 1 | | |
| Chloride | | [3] 9 | | [3] 0.9 | [3] 7.3 |
| Bromide | | | [3] 18 | | |
| Yield (based on percent P present): | | | | | |
| As N—C—P | 50 | 70 | 65 | 60 | 90 |
| As $H_3PO_3$ (unreacted) | 43 | 30 | 34 | 38 | 10 |
| As $H_3PO_4$ | 7 | 0 | 1 | 2 | 0 |

[1] Reaction mixture heated at about 100° C. for 15 minutes.
[2] Added to hot (100° C.) mixture of acid plus ammonia over 15 minutes.
[3] Percent, based on total weight of orthophosphorous acid, formaldehyde, and ammonia in reaction mixture.

In the following examples in which all parts are by weight unless otherwise specified, some of the embodiments of the present invention are demonstrated.

*Example I*

Into a conventional jacketed, glass-lined mixing vessel fitted with a water condenser are charged 246 parts of orthophosphorous acid, 53 parts of ammonium chloride, and 100 parts of water. The pH of the resulting mixture is about 0.5. This mixture is then heated to its reflux temperature, which under atmospheric pressure is about 108° C. Over a period of 30 minutes, while the mixture is being refluxed, a total of 95 parts of paraformaldehyde are added slowly into the boiling mixture. After being refluxed for an additional 20 minutes, the mixture is cooled to ambient temperature and analyzed [by observing and measuring the nuclear magnetic resonance spectra (n.m.r.) of the product] to determine how much of the P—H bond (from $HPO(OH)_2$ of orthophosphorous acid) has been converted to the N—C—P bond of the product, aminotri(methylenephosphonic acid). By n.m.r. analysis, the product yield, based on the amount of phosphorous in the starting material, is about 95%. About 5% of the original orthophosphorous acid in the reaction mixture remains unreacted.

Upon cooling to about 20° C., crystalline aminotri(methylenephosphonic acid) precipitates from the solution. By chemical analysis it is identified as practically pure aminotri(methylenephosphonic acid): Found 12.3% C, 31.6% P, 3.92% H. (Calculated: 12.0% C, 31.1% P, 4.04% H.) The product is an excellent water softener, having the ability to complex large quantities of calcium, magnesium, and iron.

When the foregoing reaction is carried out in the absence of halide ions (e.g. when 58 parts of 30% aqueous ammonia is utilized in place of the ammonium chloride in Example I), but with conditions otherwise the same, only about 65% of the phosphorous charged into the mixing vessel is converted to orthophosphorous acid to compounds containing the desired N—C—P linkage, while about 7% of the orthophosphorous acid is also converted to orthophosphoric acid, and about 27% of the orthophosphorus acid has remained unreacted. The product in this instance (containing the N—C—P linkage) is a mixture of mono-, di-, and trimethylenephosphonic acid derivatives of ammonia.

*Example II*

Into a mixing vessel such as that described in Example I, above, are charged 164 parts of orthophosphorous acid, 213 parts of n-tetradecylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then, for an additional hour after all of the formaldehyde has been added, the resulting mixture is refluxed at a temperature of about 110° C. Then the reaction mixture is cooled to room temperature. By nuclear magnetic resonance, it is found that more than 90% of the orthophosphorous acid has been converted to the desired product, n-tetradecylaminodi (methylenephosphonic acid). The equivalent weight of this product, by titration, is found to be about 137, which compares excellently with the calculated value of about 134.

*Example III*

In a mixing vessel similar to that described in Example I, above, are blended 750 parts of a 50 weight percent aqueous solution of glycine ($H_2NCH_2COOH$), 820 parts of orthophosphorous acid, and 500 parts of concentrated (ca. 38%) hydrochloric acid. The resulting blend, while being continuously stirred, is heated to 100° C. Then over a period of about 30 minutes 1500 parts of aqueous (37%) formaldehyde solution are added slowly to the blend. The reflux condenser was removed from the mixing vessel and approximately 25% of the volume of the resulting mixture is evaporated over the next 2 hours. A quantitative evaluation of the nuclear magnetic resonance spectrum of the resulting concentrated solution showed that 84 percent of the orthophosphorous acid has reacted to form the desired N—C—P linkages, 13 percent of orthophosphorous acid still remains unreacted, and less than 3 percent of the orthophosphorous acid has been oxidized to orthophosphoric acid.

The concentrated aqueous solution from Example III is then evaporated on a steam bath until a clear syrupy liquid is obtained. This syrupy liquid, when dissolved in hot ethanol and subsequently cooled, precipitates from the aqueous ethanol solution as white crystals. The molecular weight of these crystals, by titration, is 259.2, while, theoretically, it should be 263.1.

*Example IV*

In a mixing vessel similar to that described in Example I, above, are blended 169 parts of aminodiacetic acid hydrochloride, 82 parts of orthophosphorous acid, and 50 parts of concentrated hydrochloric acid. The resulting blend is heated to about 100° C. Then 200 parts of 37% aqueous formaldehyde solution is added slowly (over a period of about 30 minutes) to the hot blend. The resulting solution is maintained at about 100° C. for one hour after all of the formaldehyde solution has been added. Then 50 parts of paraformaldehyde is added slowly (over a period of about 15 minutes), and the blend is refluxed for an additional 2 hours. Nuclear magnetic resonance analysis of the resulting aqueous product indicates that about 85 percent of the orthophosphorous acid has been reacted to form the desired N—C—P linkages.

The aqueous product from Example IV is evaporated to about one-third of its volume on a steam bath, and then dissolved into hot ethanol. The subsequent addition to the alcohol solution of a small amount of HCl caused the precipitation from the alcohol solution of white crystalline material which (calculated from their equivalent weights, which are determined by basic titration) has a molecular weight of about 234. Theoretically, N,N-diacetic acid aminomethylenephosphonic acid has a molecular weight of 227.

*Example V*

Into a mixing vessel similar to that desired in Example I, above, are charged 134 parts of cyclohexylamine hydrochloride, 164 parts of orthophosphorous acid, and 25 parts of water. The resulting mixture is blended together and heated to 100° C. Then, over a period of about 30 minutes, 215 parts of benzaldehyde are slowly poured into the hot mixture. The temperature of the reaction mixture is maintained at about 100° C. for 2 hours, and then cooled to room temperature. Nuclear magnetic resonance analysis of the resulting product indicates that practically all of the orthophosphorous acid has been reacted to form the desired stable N—C—P linkages. The equivalent weight of the resulting product, cyclohexylaminodi-(benzylidenephosphonic acid) is 114 (theory=109).

*Example VI*

Into a conventional steam-jacketed stainless steel mixing vessel fitted with a reflux condenser are charged 1500 parts of ethylene diamine, 500 parts of concentrated hydrochlorine acid, and 8200 parts of orthophosphorous acid. The mixture is blended together and heated to about 100° C. (reflux temperature). Over the course of about 25 minutes, 17,000 parts of 37% aqueous formaldehyde solution are added to the boiling mixture in the mixing vessel. This represents about 100% excess formaldehyde over that which should theoretically be required to form ethylene diamine tetramethylenephosphonic acid. At the end of the addition of formaldehyde, the reaction mixture is cooled to about 25° C. A white precipitate forms, which after being filtered and washed with alcohol and acetone, has an equivalent weight of 431, which compares almost exactly with the theoretical value (432) for ethylenediamine tetramethylenephosphonic acid.

Elemental analysis of the precipitated, washed product from Example VI shows—Found: 17.0% C, 4.8% H, 27.7% P, 6.49% N. Calculated: 16.5% C, 4.6% H, 28.4% P, 6.42% N.

The following Table 2 illustrates the wide applicability of the present invention, with respect to the various primary and secondary amines, and aldehydes and ketones that can be utilized in the practice of the present invention.

TABLE 2

| Example | Nitrogenous Material | Organic Carbonyl Compound | Mole Equivalents Used N:C:P [1] | Products |
|---|---|---|---|---|
| A | Ethylamine | Formaldehyde | 1:2:2 | Ethylaminodi (methylenephosphonic acid). |
| B | Di-n-propylamine | do | 1:1:1 | Di-n-propylamino(methylenephosphonic acid). |
| C | Octadecylamine | do | 1:2:2 | Octadecylaminodi(methylenephosphonic acid). |
| D | Didodecylamine | do | 1:1:1 | Didodecylamino(methylenephosphonic acid). |
| E | Ammonia (aqueous) | Acetaldehyde | 1:3:3 | Aminotri(ethylidenephosphonic acid). |
| F | Ammonium acetate | Hendecanal | 1:3:3 | Aminotri(hendecylidenephosphonic acid). |
| G | Ammonia (aqueous) | Methylethylketone | 1:3:3 | Aminotri(2-butylidenephosphonic acid). |
| H | Ammonium carbonate | Methyldodecylketone | 1:3:3 | Aminotri(2-tetradecylidenephosphonic acid). |
| I | Isobutylamine | Propionaldehyde | 1:2:2 | Isobutylaminodi(propylidenephosphonic acid). |
| J | Diethylamine | n-Butanal | 1:1:1 | Diethylamino-n-1-butylidenephosphonic acid. |
| K | do | Methylisobutyl ketone | 1:1:1 | Diethylamino-2-hexylidenephosphonic acid. |
| L | Tridecylamine | Chloromethyl-2-furyl ketone | 1:2:2 | Tridecylaminodi(2-chloroethylidene-1-furyl phosphonic acid). |
| M | Ammonia | Formaldehyde | 1:2:2 | Mixture of amino-mono-, di- and tri-(methylenephosphonic acids). |
| N | Ammonium Chloride | do | 1:1:1 | Do. |

[1] Ratio of mole equivalents of nitrogenous material to organic carbonyl compound to orthophosphorous acid, respectively: N=nitrogenous material; C=organic carbonyl compound; P=orthophosphorous acid.

Salts of the various aminoalkylene phosphonic acids (described heretofore) with which the present invention is concerned can be made by simply neutralizing any of these phosphonic acids with a base that contains essentially the desired cation. For example, to make a sodium salt, one of the aminoalkylene phosphonic acids can be neutralized with a base containing the sodium cation, such as NaOH, $Na_2CO_3$, and the like.

Having thus described the invention and several specific embodiments of it, what is claimed is:

1. A process which comprises forming an aqueous mixture having a pH below about 4 containing a nitrogenous material selected from the group consisting of ammonia, primary amines, and secondary amines; an organic carbonyl compound selected from the group consisting of aldehydes and ketones; and orthophosphorous acid, and subjecting said mixture to temperatures above about 70° C., whereby an aminoalkylenephosphonic acid compound having at least one N—C—P linkage (wherein said P is from said orthophosphorous acid) is formed.

2. A process as in claim 1 wherein said mixture additionally contains at least a catalytic amount of halide ions in order to inhibit the oxidation of said orthophosphorous acid to orthophosphoric acid during said process.

3. A process for manufacturing an amino-mono-alkylenephosphonic acid, which process comprises forming a mixture containing a secondary amine, an organic carbonyl compound selected from the group consisting of aldehydes and ketones, and orthophosphorous acid, subjecting said aqueous mixture to an elevated temperature for a period of time sufficient to form said amino-mono-alkylenephosphonic acid.

4. A process as in claim 3 wherein the molar equivalent ratio of said organic carbonyl compound to said secondary amine in said mixture is at least about 1:1, respectively, and the molar equivalent ratio of said orthophosphorous acid to said secondary amine in said mixture is at least about 1:1, respectively.

5. A process for manufacturing an amino-mono-alkylenephosphonic acid, which process comprises forming a mixture containing a secondary amine, an organic carbonyl compound selected from the group consisting of aldehydes and ketones, and orthophosphorous acid, the pH of said mixture being below about 4, the molar equivalent ratio of said organic carbonyl compound to said secondary amine in said mixture being at least about 1:1, respectively, and the molar equivalent ratio of said orthophosphorous acid to said secondary amine in said mixture being at least about 1:1, respectively, and subjecting said mixture to a temperature above about 75° C., whereby said amino-mono-alkylenephosphonic acid is formed.

6. A process as in claim 5, wherein said mixture additionally contains at least about 0.5 weight percent of halide ions.

7. A process for manufacturing an amino-mono-alkylenephosphonic acid, which process comprises forming an aqueous mixture containing a secondary amine, an organic carbonyl compound selected from the group consisting of aldehydes and ketones having boiling points below about 75° C., and orthophosphorous acid (the molar equivalent ratio of said orthophosphorous acid to said secondary amine in said mixture being at least about 0.9:1, respectively, and the molar equivalent ratio of said organic carbonyl compound to said secondary amine in said mixture being at least about 1:1, respectively) by adding over a period of at least about 10 minutes said organic carbonyl compound to a blend having a pH below about 2 and containing said secondary amine and said orthophosphorous acid while said blend is at a temperature above about 75° C.

8. A process as in claim 7, wherein said blend additionally contains between about 0.5 and about 20 weight percent of halide ions.

9. A process for manufacturing an amino-di-alkylenephosphonic acid, which process comprises forming a mixture containing a primary amine, an organic carbonyl compound selected from the group consisting of aldehyde and ketones, and orthophosphorous acid, subjecting said aqueous mixture to an elevated temperature for a period of time sufficient to form said amino-di-alkylenephosphonic acid.

10. A process as in claim 9 wherein the molar equivalent ratio of said organic carbonyl compound to said primary amine in said mixture is at least about 1:1, respectively, and the molar equivalent ratio of said orthophosphorous acid to said primary amine in said mixture is at least about 1:1, respectively.

11. A process for manufacturing an amino-dialkylenephosphonic acid, which process comprises forming an aqueous mixture containing a primary amine, an organic carbonyl compound selected from the group consisting of aldehydes and ketones, and orthophosphorous acid, the pH of said mixture being below about 4, the molar equivalent ratio of said organic carbonyl compound to said primary amine in said mixture being at least about 1:1, respectively, and the molar equivalent ratio of said orthophosphorous acid to said primary amine in said mixture being at least about 1:1, respectively, and subjecting said mixture to a temperature above about 75° C., whereby said amino-di-alkylenephosphonic acid is formed.

12. A process as in claim 9, wherein said mixture additionally contains at least about 0.5 weight percent (based on the total weight of said primary amine, said organic carbonyl compound, and said orthophosphorous acid in said mixture) of halide ions.

13. A process for manufacturing an amino-di-alkylenephosphonic acid, which process comprises forming an aqueous mixture containing a primary amine, an organic carbonyl compound selected from the group consisting of aldehydes and ketones, having boiling points below about 75° C., and orthophosphorous acid (the molar equivalent ratio of said orthophosphorous acid to said primary amine in said mixture being at least about 0.9:1, respectively, and the molar equivalent ratio of said organic carbonyl compound to said primary amine in said mixture being at least about 1:1, respectively) by adding over a period of at least about 10 minutes said organic carbonyl compound to a blend having a pH below about 2 and containing said primary amine and said orthophosphorous acid while said blend is at a temperature above about 75° C.

14. A process as in claim 13, wherein said blend contains, additionally, from about 0.5 to about 20 weight percent of halide ions.

15. A process for manufacturing an amino-trialkylenephosphonic acid, which process comprises forming an aqueous mixture having a pH below about 4 containing ammonia, an organic carbonyl compound selected from the group consisting of aldehydes and ketones, and orthophosphorous acid, subjecting said aqueous mixture to temperatures above about 70° C. until said ammonia, said organic carbonyl compound, and said orthophosphorous acid have interacted to form said amino-tri-alkylenephosphonic acid.

16. A process as in claim 15 wherein the molar equivalent ratio of said organic carbonyl compound to said ammonia in said mixture is at least about 1:1, respectively, and the molar equivalent ratio of said orthophosphorous acid to said ammonia in said mixture is at least about 1:1, respectively.

17. A process for manufacturing an amino-tri-alkylenephosphonic acid, which process comprises forming an aqueous mixture containing ammonia, an aliphatic aldehyde, and orthophosphorous acid, the pH of said mixture being below about 4, the molar equivalent ratio of said aldehyde to said ammonia in said mixture being at least about 1:1, respectively, and the molar equivalent ratio of said orthophosphorous acid to said ammonia in said mixture being at least about 1:1, respectively, and subjecting said mixture to a temperature above about 75° C., whereby said amino-tri-alkylenephosphonic acid is formed.

18. A process as in claim 17, wherein said mixture additionally contains at least about 0.5 weight percent of halide ions.

19. A process for manufacturing an amino-tri-alkylenephosphonic acid, which process comprises forming an aqueous mixture containing ammonia, an aldehyde having a boiling point below about 75° C., and orthophosphorous acid (the molar equivalent ratio of said orthophosphorous acid to said ammonia in said mixture being at least about 0.9:1, respectively, and the molar equivalent ratio of said aldehyde to said ammonia in said mixture being at least about 1:1, respectively) by adding over a period of at least about 10 minutes said aldehyde to a blend having a pH below about 2 and containing said ammonia and said orthophosphorous acid while said blend is at a temperature above about 75° C.

20. A process as in claim 19, wherein said blend additionally contains from about 0.5 to about 20 weight percent of halide ions.

21. A process for manufacturing amino-tri-methylenephosphonic acid, which process comprises forming an aqueous mixture of ammonia and orthophosphorous acid in a molar ratio of said ammonia to said orthophosphorous acid of about 1:3, respectively, and at least about 0.5 weight percent of chloride ions, the pH of said mixture being below about 2, blending into said mixture over a period of at least about 5 minutes, while said mixture is at a temperature above about 85° C., at least about 3 molar equivalents (based on the amount of said ammonia in said mixture) of formaldehyde, and maintaining the temperature of the resulting blend above about 85° C. for at least about 10 minutes after the beginning of said blending, whereby said amino trimethylenephosphonic acid is produced.

22. A process as in claim 2, wherein said organic carbonyl compound is an aldehyde.

23. A process as in claim 22, wherein said aldehyde is formaldehyde.

References Cited by the Examiner
UNITED STATES PATENTS 2,635,112  4/1953  Fields _____ 260—500

OTHER REFERENCES

Blicke: Organic Reactions, vol. 1, John Wiley & Sons, N.Y., 1954, p. 304.

Conant: "Jour. Am. Chem. Soc.," vol. 42, pp. 2337–43 (1920).

Fields: J. Am. Chem. Soc., vol. 74, 1952, pp. 1528–1531.

Frank: Chem. Reviews, vol. 61, August 1961, pp. 392–394.

Houben-Weyl: "Methoden der organischen Chemie," vol. 12/1, pp. 361–2 (1963).

Kosolapoff: Organophosphorous Compounds, John Wiley & Sons, N.Y., 1950, p. 129.

Krentzkamp et al.: Chem. Abst., vol. 55, May 1961, col. 10360c.

Petrov et al.: "Chem. Abst.," vol. 54, col. 260 (1960).

LEON ZITVER, *Primary Examiner.*

B. M. EISEN, *Assistant Examiner.*

Dedication 3,288,846.—*Riyad R. Irani* and *Kurt Moedritzer*, St. Louis, Mo. PROCESSES FOR PREPARING ORGANOPHOSPHONIC ACIDS. Patent dated Nov. 29, 1966. Dedication filed Oct. 11, 1977, by the assignee, *Monsanto Company*.

Hereby dedicates to the Public the entire term of said patent.

[*Official Gazette January 17, 1978.*]